June 29, 1965 J. V. BRAHAM 3,191,581
FEED LOT CONVEYOR SYSTEM
Filed Dec. 17, 1962 2 Sheets-Sheet 1

JAMES V. BRAHAM
INVENTOR

Huebner & Worrel
ATTORNEYS

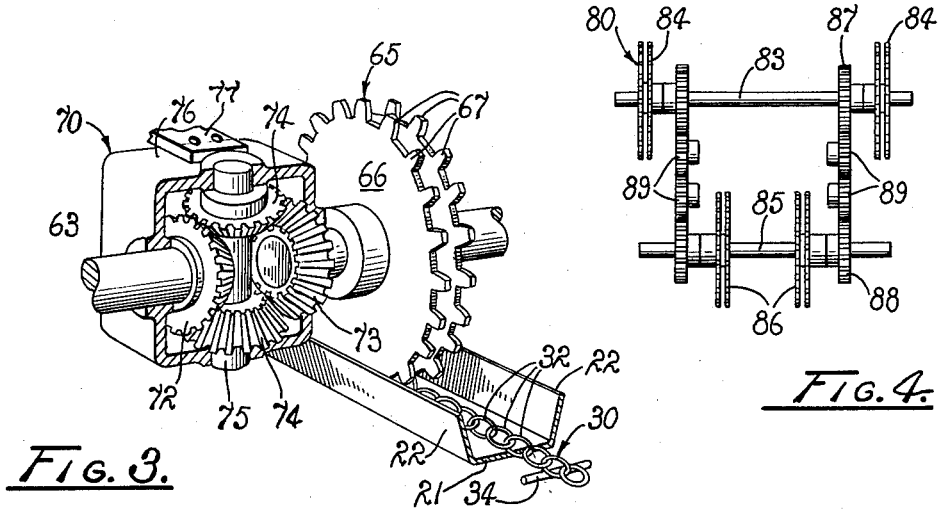

United States Patent Office 3,191,581
Patented June 29, 1965

3,191,581
FEED LOT CONVEYOR SYSTEM
James V. Braham, 17250 S. Del Ray Ave.,
Kingsburg, Calif.
Filed Dec. 17, 1962, Ser. No. 245,274
4 Claims. (Cl. 119—52)

The present invention relates to a feed lot conveyor system particularly adapted for animal feeders and the like having a plurality of movable conveyors arranged to provide optimum distribution of feed throughout substantially the entire feed lot.

It has long been a problem adequately to distribute feed to all portions of an animal feeding area such as a brooder house or the like. Conventional feeding systems employ a plurality of endless conveyors which receive feed from a centrally located hopper. The hopper mounts a drive mechanism which engages and motivates the conveyors in a circuitous path about the feeding area. The conveyors are driven through the hopper in feed receiving relation thereto so that fresh feed is transported outwardly therefrom in a common direction of travel. In such systems, the poultry congregate about the feed receiving portion of the conveyors adjacent to the hopper, compete for the feed, and deplete the supply of fresh feed before the conveyors reach outer portions of the feeding area. Under such conditions, many chickens or other poultry or trampled or suffocated in the crowded areas around the feed receiving portions of the conveyors while those remaining in the outer portions of the feeding area are inadequately fed or even starved.

A solution to this problem is to reverse the direction of travel of certain conveyors in the system to direct fresh feed to the usual return portion of the conveyors. However, attempts to provide such reverse drive to selected conveyors in such system have not previously been satisfactory. Such attempts have consisted of providing separate drive shafts to the conveyors which are to be reversed, which arrangement requires separate drive motors for each shaft. However, poultry feeding operations do not warrant the added expense of such additional equipment and therefore such arrangement has not been economically feasible or practical. For the same reason, completely separate conveyor systems are not practical.

In order to provide a workable unitary system, conveyor arrangements having 180° reverse bends have been employed to transport fresh feed to the usual return portions of the system. This arrangement also is not workable in that the conveyors are not easily adapted to bends of more than 90°. When attempting to force the conveyors around a bend of any greater angularity, an undue load is imposed upon the drive motor requiring frequent replacement thereof or installation of a larger motor. Theoretically, the conveyor could be reversed by replacing the 180° turn with a series of 90° bends. This, however, is not practical due to the increased space required. Furthermore, with the increase in conveyor length necessary to negotiate such additional bends, again too high a load is imposed on the drive motor.

Therefore, it is an object of the present invention to provide a feed lot conveyor system providing optimum feed distribution throughout substantially the entire system.

Another object is to provide a feed lot conveyor system effective to minimize crowding or undesirable concentration of chickens and the like resulting from improper feed distribution.

Another object is to provide such a conveyor system which is effective to minimize starvation of the less aggressive poultry which are incapable of competing or disinclined to compete for food under conditions of excessive crowding.

Another object is to provide a conveyor system of the character described having a unitary conveyor drive mechanism.

Another object is to provide a feed lot conveyor system having a unitary drive mechanism which is readily adapted to existing conveyor systems.

Another object is to provide such a drive mechanism capable of driving adjacent circuitous portions of the conveyors in opposite directions so as to transport fresh feed to all portions of the system.

Other objects and advantages of the present invention will become more fully apparent in the subsequent description in the specification.

In the drawings:

FIG. 2 is a somewhat enlarged vertical section through a feed hopper and associated feed constraining troughs taken along line 2—2 of FIG. 1, with a reversing conveyor drive mechanism shown in elevation in the system of the present invention.

FIG. 3 is a further enlarged fragmentary perspective of the reverse drive mechanism of FIG. 2 associated with a feed conveyor and trough.

FIG. 4 is a plan view of a modified form of the reversing drive mechanism of FIG. 3.

Figure 1:
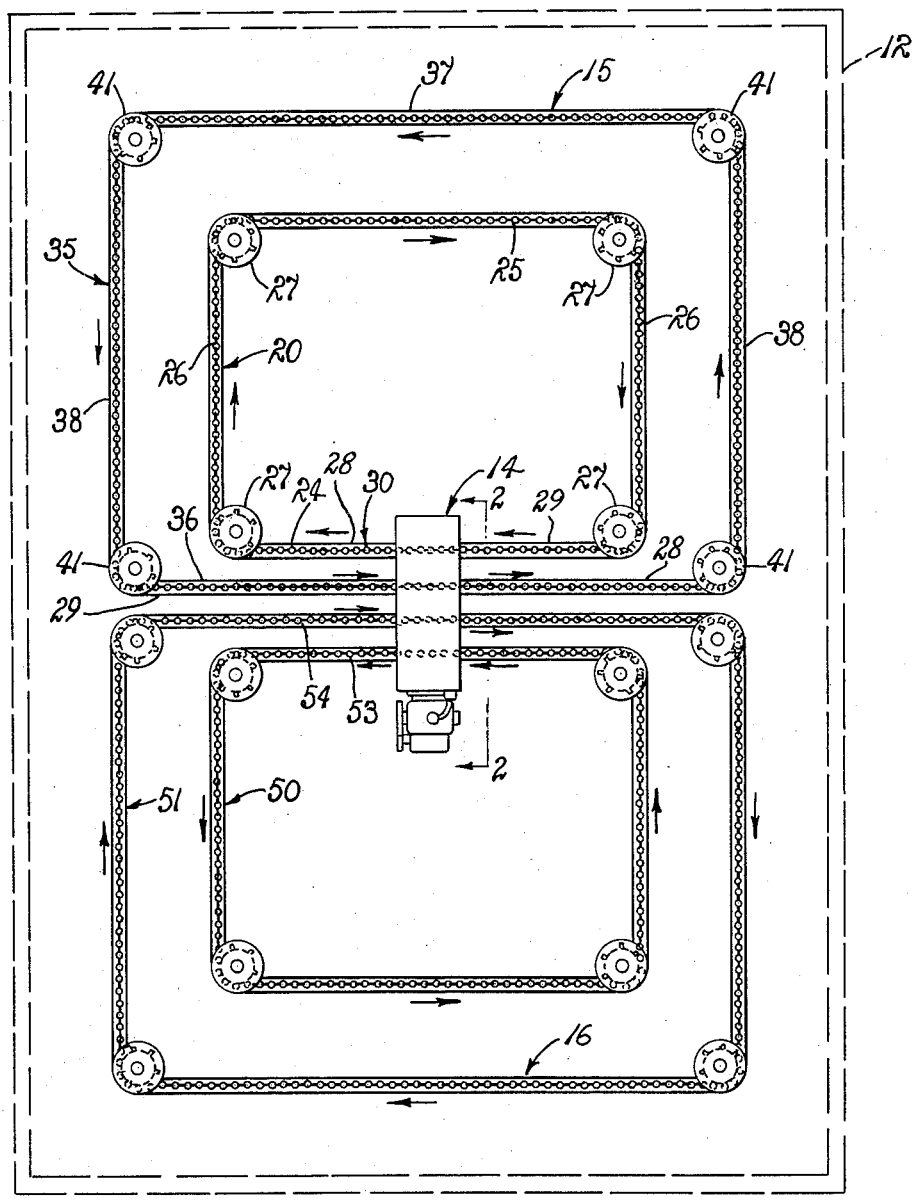
FIG. 1 is a top plan view of the conveyor system of the present invention disposed within a feed lot having an outer margin represented in dashed lines.

Referring more particularly to the drawings, the conveying system of the present invention is shown disposed within a feed lot marginally indicated by the dashed lines 12 which are representative of the walls of a chicken house or the constraining fence of an open feed lot defining a predetermined feeding area. The system provides a centrally located feed hopper 14 having a pair of sets of feed conveying units 15 and 16 associated therewith arranged symmetrically within the feed lot 12. Although the conveying system of the illustrated embodiment of the present invention is disclosed as having only two units for illustrative convenience, it may be provided with a greater or fewer number of such units as circumstances suggest.

Each of the conveying units 15 and 16 provides a continuous substantially rectangularly arranged inner feed trough 20 having a bottom wall 21 and opposite upstanding outwardly diverging side walls 22. The inner trough 20 has a feed receiving run 24 extending through the hopper 14 and an opposite outer distributing run 25 which are interconnected by opposite side runs 26. A plurality of toothed rollers 27 are rotatably supported on substantially vertical axes individually adjacent to the inner corners of the trough. The feed receiving run 24 provides a feed outlet portion 28 and a return portion 29 extending in opposite directions from the hopper 14. An endless conveyor chain 30 is disposed within the trough 20 and includes a plurality of interconnected links 32 trained over the toothed rollers 27. The links are disposed so that each successive link is positioned in a plane turned 90° from its adjacent link. As best shown in FIG. 3, alternate links are disposed in substantially horizontal planes parallel with the bottom wall 21 of the trough whereas the interconnecting links are disposed in substantially vertical planes. A plurality of flight bars 34 are rigidly mounted in equally spaced relation along the chain in sliding engagement with the bottom wall 21 of the trough.

A somewhat enlarged outer feed trough 35 is disposed in circumscribing relation about the inner trough 20 and has opposite feed receiving and distributing runs 36 and 37 respectively joined by side runs 38, all of which are spaced in substantially parallel relation to their corresponding runs of the inner feed trough 20. The trough 35 includes a bottom wall 39 and opposite upstanding diverging side walls 40 identical to the inner feed trough 20. The outer trough 35 also mounts a plurality of corner rollers 41 which support an endless feed conveying chain 42 similar to the chain 30 of the inner trough and has a plurality of flight bars 43 rigidly mounted thereon in sliding engagement with the bottom wall 39.

The opposite feed conveying unit 16 is substantially identical to the conveying unit 15 described above which, for the purposes of the present description, will be only briefly referred to as having inner and outer troughs 50 and 51, respectively. The troughs have inner feed receiving runs 53 and 54, respectively, extended through the hopper 14 in spaced substantially parallel relation to the inner feed receiving runs 24 and 36 of the feed conveying unit 15.

As best shown in FIG. 2, a speed reducing drive mechanism 60 is mounted adjacent to the hopper and is driven by a motor 61 mounted on the side wall of the hopper by a pulley and belt arrangement 62. An elongated drive shaft 63 from the drive mechanism is extended through the side wall of the hopper on suitable bearings to mount a plurality of double sprocket wheels 65 aligned with the feed troughs 20, 30, 50 and 51. As best shown in FIG. 3, each of the sprockets includes a pair of spaced substantially parallel plates 66 each having a plurality of peripherally extended teeth 67. The sprockets are disposed in the troughs between the side walls thereof with the teeth 67 closely spaced adjacent to the bottom walls of their respective troughs. The teeth 67 thereby engage the horizontally disposed links of the conveyor chains while the vertical links are accommodated by the clearance between the plates 66.

In order to travel the conveyor chains of the inner and outer feed troughs in opposite directions to each other, a reverse drive mechanism 70 is interposed the drive shaft 63 between the troughs of each set of conveyor units 15 and 16. As best shown in FIG. 3, each reversing unit includes an input pinion gear 72, an opposite output pinion gear 73, and a pair of freely rotatable beveled idler gears 74. The idlers are mounted on a stationary shaft 75 rigidly mounted in a housing 76 secured to the hopper by a bracket 77. With such arrangement, the output gear 73 is rotated in an opposite direction to that of the input gear 72 so that the adjacent sprockets 65 on opposite sides of the reversing drive mechanism are effective to motivate their respective feed conveyors in opposite directions.

In certain hopper installations of limited size, the reverse drive mechanism 70 cannot be used because of the closely spaced drive sprockets. In such event, a modified form of the reverse drive mechanism is provided in FIG. 4 having an arrangement of spur gears generally indicated at 80 to obtain the same result as that of the preferred embodiment. In this form, an elongated drive shaft 83 is journaled in the hopper and mounts a pair of drive sprockets 84 at its opposite ends. An auxiliary shaft 85 is journaled in spaced substantially parallel relation to the drive shaft 83 in the hopper and mounts a pair of relatively closely spaced sprockets 86. The sprockets 84 and 86 are aligned in corresponding relation with the spacing of the troughs 20, 30, 50 and 51 through the hopper. The shafts 83 and 85 each mount a pair of spur gears 87 and 88, respectively, which are interconnected by pairs of idler gears 89 to reverse the rotation of the shafts and their respective drive sprockets.

*Operation*

The operation of the described embodiment of the subject invention is believed to be clearly apparent and is briefly summarized at this point. With a sufficient number of poultry occupying the feeding area to cause crowding, as is the normal circumstance, it is natural that such poultry congregate in an area having the largest volume of fresh feed. In order to distribute feed throughout the entire feeding area better to distribute the chickens therein the motor 61 is actuated to rotate the drive shaft 63 and the sprockets 65. Such action causes the conveyor chain 30 within the trough 20 to be motivated in the direction of the arrow in FIG. 1. Concurrently, such drive is transmitted through the input pinion gear of the reverse drive mechanism 70 to cause the sprockets 65 within the outer feed trough 35 to be rotated to drive the conveyor chain 42 in an opposite direction to the conveyor chain 30, as also indicated by its respective arrow in FIG. 1. During movement of the conveyor chains, the inner feed receiving runs 24 and 36 of the troughs are filled with fresh feed from the hopper and the feed is transported throughout the respective outer feed distributing runs 25 and 37 by the conveyor chains 30 and 42. With such arrangement, the feed receiving run of the inner trough 20 supplies fresh feed at a position adjacent to the normally substantially empty return run of the outer trough 35 thereby supplying feed to an area of the system, which, in conventional practices, is starved by the heavy concentration of chickens around the feed receiving portion of the conveyors. Also, the oppositely traveled feed receiving runs of the conveyors tend to pull feed in the hopper alternately toward opposite walls thereof which has a stirring effect to provide improved mixing and more even distribution of feed into the conveyors.

The second form 80 of the reverse drive mechanism is functionally identical to the preferred embodiment. The drive shaft 83 is driven by the motor 61 to rotate the sprockets 84 in one direction for motivating the conveyors in the feed receiving runs 24 and 53 in a common direction. Such drive is reversed to the sprockets 86 engaging the conveyors in the feed receiving runs 36 and 54 by the spur gears 87 and 88 and the idlers 89 intermeshed therebetween.

In view of the foregoing, it is readily apparent that the structure of the present invention provides an improved conveyor system for feed lots by distributing the feed from a single centrally located hopper more evenly to all portions of the feeding area. Such structure employs a reverse drive mechanism which is easily operated by the usual motor supplied with the feed hoppers.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a poultry feeding system having a feed hopper; sets of individually continuous feed troughs having feed receiving runs beneath the feed hopper, and feed distributing runs, each of said receiving runs having opposite feed outlet and return portions oppositely extended from the hopper; feed conveying means disposed in each of said troughs; and powered means having a plurality of drive members providing driving connection to each of said conveying means for circuitous movement of the conveying means longitudinally through their respective troughs, said powered means including a plurality of reversing members to cause the conveying means in successive troughs to move in opposite directions to distribute feed throughout the system so that the outlet portion of one of the feed receiving runs in each of said sets of troughs is adjacent to the return portion of the other feed receiving run in said sets of troughs.

2. In a poultry feeding system having a feed hopper; sets of individually continuous feed troughs having feed receiving runs disposed in spaced substantially parallel relation beneath the feed hopper, and feed distributing runs disposed in spaced substantially parallel relation, each of said feed receiving runs having opposite feed outlet and return portions oppositely extended from the hopper; a feed conveyor disposed in each of said troughs;

and powered means having a plurality of toothed members providing driving connection to each of said conveyors for circuitous movement of the conveyors longitudinally through their respective troughs, said powered means including a plurality of drive reversing gears interposed said toothed members to cause successive conveyors to move in opposite directions to distribute feed throughout the system so that the outlet portion of one of the feed receiving runs in each of said sets of troughs is adjacent to the return portion of the other feed receiving run in said sets of troughs.

3. In a poultry feeding system having a feed hopper centrally disposed within a feeding area over which poultry is permitted to roam; a plurality of sets of individually continuous feed troughs symmetrically arranged within the feeding area having feed receiving runs disposed in spaced substantially parallel relation beneath the feed hopper, and feed distributing runs continuous with the receiving runs disposed in spaced substantially parallel relation, each of said feed receiving runs having opposite feed outlet and return portions oppositely extended from the hopper; a plurality of endless chains individually disposed within said troughs having longitudinally spaced feed motivating members thereon slidably engaging the troughs; a powered drive shaft journaled in the hopper; a plurality of sprocket wheels mounted on the drive shafts in driving relation to said chains for circuitous movement of the chains longitudinally through their respective troughs; and a plurality of sets of drive reversing gears mounted on said drive shaft between the sprocket wheels of each set of troughs, each set of reversing gears including beveled input and output gears mounted on the drive shaft in axially spaced relation, and at least one beveled idler gear disposed in intermeshing relation between said input and output gears to cause successive sprocket wheels on the drive shaft to drive the chains in successive troughs in opposite directions to distribute fresh feed through each of said outlet portions of the feed receiving runs to said feed distributing runs and back to the hopper by way of the return portions of the feed receiving runs; of the troughs with said outlet and return portions of one of the feed receiving runs of each set of troughs being respectively adjacent to the return and outlet portions of the other feed receiving run in each set of troughs.

4. In a poultry feeding system having a feed hopper; sets of individually continuous feed troughs having feed receiving runs disposed in spaced substantially parallel relation beneath the feed hopper with the hopper dividing each of said feed receiving runs into a feed outlet portion and a return portion, said feed outlet and return portions of each feed receiving run of the troughs being adjacent to dissimilar portions of succesive feed receiving runs of the troughs, and feed distributing runs disposed in spaced substantially parallel relation; a feed conveyor disposed in each of said troughs; and powered means having a plurality of spaced tooth members providing driving connection to each of said conveyors for circuitous movement of the conveyors longitudinally through their respective troughs, said powered means including a plurality of drive reversing gears interposed with said tooth members to cause the conveyors in said adjacently disposed dissimilar outlet and return portions of said feed receiving runs to move in opposite directions to distribute feed throughout the system.

References Cited by the Examiner
UNITED STATES PATENTS

| 2,504,781 | 4/50 | Alben | 74—792 |
|---|---|---|---|
| 2,694,281 | 11/54 | Beck | 74—792 X |
| 2,705,474 | 4/55 | Siciliano | 119—52 |
| 2,742,139 | 4/56 | Smallegan | 119—52 X |
| 2,754,801 | 7/56 | Reese | 119—52 |
| 2,782,761 | 2/57 | Martin et al. | 119—52 |

FOREIGN PATENTS 208,653  4/60  Austria.

SAMUEL KOREN, *Primary Examiner.*

CARL W. ROBINSON, HUGH R. CHAMBLEE,
*Examiners.*